United States Patent
Petty (10) Patent No.: US 6,649,062 B1
(45) Date of Patent: Nov. 18, 2003

(54) FLUID-MEMBRANE SEPARATION

(76) Inventor: Stephen E. Petty, 5263 Whitegate Ct., Dublin, OH (US) 43016

(*) Notice: Subject to any disclaimer, the term of this patent is extended or adjusted under 35 U.S.C. 154(b) by 1095 days.

(21) Appl. No.: 08/824,153

(22) Filed: Mar. 25, 1997

Related U.S. Application Data (60) Provisional application No. 60/014,236, filed on Mar. 26, 1996.

(51) Int. Cl.$^7$ .................................................. C02F 1/44
(52) U.S. Cl. ...................... 210/649; 210/644; 210/640; 585/818; 585/819; 95/43; 95/45
(58) Field of Search ................................ 210/649, 640, 210/651, 644; 585/818, 819; 95/43, 45; 250/288

(56) References Cited

U.S. PATENT DOCUMENTS 4,958,529 A * 9/1990 Vestal ......................... 250/288
5,160,044 A * 11/1992 Tan ............................. 210/651

* cited by examiner

*Primary Examiner*—Ana Fortuna
(74) *Attorney, Agent, or Firm*—Philip J. Pollick (57) ABSTRACT

A process for the separation of mixture components uses a supercritical fluid that is fresh to at least one side of a nonporous membrane after which the fluid is either recycled to the opposite side of the membrane or removed from the separation process. Fluids and membranes, including modified membranes, are provided to facilitate passage of one or more components of a mixture through the membrane while retarding passage of other components of the mixture. The process is useful for the separation of mixtures with similar components including axeotropic mixtures and pharmaceutical and biological products.

30 Claims, 6 Drawing Sheets

FLUID-MEMBRANE SEPARATION

CROSS REFERENCE TO RELATED APPLICATION

This application claims the benefit of U.S. provisional application No. 60/014,236 filed on Mar. 26, 1996 which is incorporated by reference as if completely written herein.

BACKGROUND OF THE INVENTION

1. Field of the Invention

This invention relates to a combination of fluid extraction and membrane technologies in which unequal rates of transport through a nonporous membrane is achieved by solution and diffusion mechanisms driven by a difference in free energy of the preselected species across the membrane. More specifically this invention uses a supercritical fluid on at least one side of a nonporous membrane and at least one fluid that is fresh to the process on at least one side of the membrane after which the fluid is either recycled to the opposite side of the membrane or removed from the separation process. Fluids and membranes, including modified membranes, are provided to facilitate passage of one or more components of a mixture through the membrane while rejecting other components of the mixture.

2. Background

Reverse osmosis, as a commercial separation technique, has been available for over twenty-five years. In reverse osmosis, the osmotic pressure normally present between two solutions with different solute concentrations is reversed by using an externally applied pressure in the presence of a semi-permeable membrane. The membrane, placed between solutions of different concentrations, preferentially passes one component of the more concentrated solution into the more dilute solution, e.g., water from a saline solution to the pure water side. Much of the work in reverse osmosis has involved the development of new membrane materials and structures. Most membranes currently available are based on cellulose acetate, aromatic polyamide, and polyethyleneimine/polysulfone polymers. Variations in substituted polymer end groups are used to affect the flux and selectivity of a membrane for a specific application. The structure of the membrane is affected by the method of membrane deposition, the amount of cross-linkage, the temperature at which it is formed, and the speed at which the formed membrane is cured. Because of the number of chemical and structural variables available, membrane development has remained an empirical and costly art.

Because of the costly empirical nature of developing new membranes and the large number of membranes currently available, the current direction in membrane research is toward developing novel methods for the use of existing membranes. The approach is particularly evident in the field of biotechnology where conventional membranes are used in cell/protein and protein/protein separations.

Pervaporation is a membrane separation process where a liquid mixture is contacted with the membrane. A component of the mixture diffuses through the membrane and evaporates from the downstream surface of the membrane. Characteristically, a pervaporation system is operated by passing the liquid feed (at atmospheric pressure) over the surface of the membrane and removing the permeate vapor under vacuum on the downstream side of the membrane. The process is useful, in terms of effective separations at reasonable flux rates, only if the partial pressure of the permeating component(s) in the downstream gas phase is small relative to the upstream liquid vapor pressure.

The process suffers from two serious operational difficulties. First permeate vapor delivered at low pressure will have a low mass density and will require high volumetric fluxes in order to operate as an economical process. The high vapor flux requirements necessitate large trans-membrane pressure drop that increase capital and operating costs for a single-stage process to uneconomical levels. These costs can be reduced somewhat by staging the process. Second, the energy required to evaporate the permeate is not available from the sensible energy of the systems and must be supplied from external sources. Construction of the membrane module from thermally conductive materials, e.g., copper or aluminum, can provide the needed heat but makes the cost of the modules unacceptably high. The problem can be avoided by the addition of steam to the vapor side of the membrane. However, the steam temperature must be held below the boiling temperature of the upstream liquid mixture to minimize upstream vapor formation. Also, the stream-to-permeate ratio must be kept large enough to keep the partial pressure of the permeate in the stream low relative to the vapor pressure of the liquid mixture. This ensures the separation of the mixture components.

Perstraction is a membrane process whereby the permeate is removed from the downstream side of the membrane by a receiving liquid. The receiving fluid, if properly selected, has the effect of lowering the chemical potential on the downstream side of the membrane. Selection of the receiving liquid is critical to the concept. The receiving liquid must be 1) essentially incapable of permeation through the semi-permeable membrane, 2) lower in volatility than the permeating components, and 3) capable of dissolving a substantial quantity of the permeate. Examples of such materials include high-boiling, high molecular weight hydrocarbon oils, hydrotropes (e.g., sodium toluene sulfonate), concentrated aqueous solution of soap or micellizing surfactant, and concentrated, stable polymer lattices. It is noted that is unnecessary to recover all the permeate from the receiving liquid. It may be more economical to remove only a portion of the permeate from the receiving liquid and recycle the receiving liquid back to the membrane module. The ratio of receiving liquid to permeate can be as high as 20:1. The perstraction technique offers several advantages over other membrane separation processes. First, perstraction offers lower heat and power costs over competing process. Second, the permeation process can operate near atmospheric pressure without imposing significant stress on the membrane. Third, unlike pervaporation, the permeate is in a liquid rather than a vapor state; a fact which reduces the amount of downstream processing needed.

Although some effort has been made in using supercritical solvents with nonporous membranes (Schuker, U.S. Pat. No. 5,430,224), such efforts have focused on the use and recycling of the supercritical solvents on both sides of the membrane. Such recycling can result in the build-up of unwanted materials in the recycled solvent especially when either the permeate (components passing through the membrane) or the retenate (components not passed through the membrane) or both are not readily separated from the supercritical solvent. Further the energy used in separating and recycling the solvent often is not cost effective. And finally the energy costs associated with providing a supercritical solvent to both sides of the membrane are often not justified in many separation processes.

Accordingly, it is an object of the present invention to provide a membrane separation process that 1) extends the range of possible separations to a wider range of components, 2) improves the selectivity for passing or retaining various mixture components with respect to a nonporous membrane, and 3) renders the entire process more cost effective.

SUMMARY OF THE INVENTION

The process of the instant invention consists of first providing a nonporous (dense) membrane having two sides, a first side and a second side. The membrane may be in a flat sheet, spiral wound, a hollow fiber, or other suitably provided membrane configuration. Generally the hollow fiber configuration is preferred since it allows manifolding of fluids to the first side or second side or both sides of the nonporous membrane. The membrane is selected or otherwise treated to reject or pass various components from the mixture to be separated. For example, a membrane with hydrophobic properties or treated to have hydrophobic properties can be used to reject water and water-like mixture components from passing through the membrane while a membrane with hydrophilic properties or treated to have hydrophilic properties can be used to facilitate passage of water and water-like mixture components through the membrane.

The next step in the process is to provide a mixture for separation that has at least two components, a first component and a second component. Because of the wide variety of fluids and membranes combinable for a particular separation process, a wide variety of separations are contemplated by this invention including 1) pharmaceuticals and biological products in the field of biotechnology, 2) azeotropic mixtures such as ethanol/water and styrene/ethylbenzene, and 3) consumer products such as the removal of caffeine from coffee.

Next fluids are provided for the process with a first fluid being used on one side of the membrane and a second fluid being used on the second side of the membrane. Selection of appropriate fluids aids the separation process significantly. Thus a hydrophobic fluid is used on the second side of the membrane to enhance the rejection of a hydrophilic mixture component, that is, retard the passage of such a component through the membrane while the use of a hydrophilic fluid on the second side of the membrane facilitates and enhances the passage of a hydrophilic component through the membrane. In providing fluids, a key feature of this invention is that at least one of the fluids, that is, either the first fluid or the second fluid must be a fresh or virgin solvent with regard to the process. That is, the fluid on at least one side of the process cannot be recycled to that side of the process. Such use of fresh fluid has the advantage of avoiding a build-up of unwanted volatiles or hard to remove components that otherwise lessen the efficiency of the process. Although the fluid can not be recycled on the same side of at least one side of the process, the present invention does contemplate the use of the same fluid on both sides of the membrane, that is, recycle of the fluid from one side of the nonporous membrane to the other side of the membrane. In such situations, the fluid is essentially identical on both sides of the membrane. However, and as noted above, the use of different fluids on each side of the membrane is often desirable to facilitate and improve the efficiency of the membrane separation process. In any event, the fluid on at least one side of the membrane must be in the supercritical state.

Next the mixture to be separated is optionally combined with the first fluid to form a fluid mixture, it being noted that in certain instances the mixture to be separated can be passed by the membrane without an additional fluid. One of the components of the mixture must be being capable of passing through the membrane (i.e., the permeate) while the other component is retained or prevented from passing though the membrane (i.e., the retenate). new A driving force is then provided so that when the mixture is passed over the first side of the membrane, separation of the mixture occurs as a result of the first mixture component passing through the membrane to the second side of the membrane where it is removed by passing a fluid over the second side of the nonporous membrane. The second component of the mixture is retained on the first side of the membrane. The driving force is a concentration gradient although other gradients such as temperature and pressure may further promote the separation process.

The use of a fluid on either side of the membrane that retards or promotes the passage of various components through the membrane is an important aspect of this invention. For example, a fluid on the second side of the membrane (permeate side) can be chosen to facilitate the passage of one mixture component while retarding the passage of a second component of the mixture. Thus a hydrophobic fluid used on the second side of the membrane can be effectively used to retard the passage of a water or water-like component from the first side of the membrane. In sum, the use of one or more fluids or a membrane or both that facilitates and promotes passage or retention or both of selected components of the mixture through the membrane is a key feature of this invention. The permeate can be removed from the receiving fluid by flashing of the solvent or other removal techniques such as phase separation. Similarly the retenate can be removed from the first solvent by similar techniques.

The present fluid/membrane separation process minimizes the process energy required to separate the permeate from the extractant and improves the permeability and/or selectivity for the component to be separated over that of conventional separation systems. One way the present invention accomplishes this is through the feature of using a supercritical receiving fluid (permeate fluid) to remove the permeate from the downstream side of the membrane. Advantages to using a supercritical receiving fluid include: 1) no phase change of the receiving fluid affording a less energy-intensive separation; 2) increased selectivity of the membrane/fluid system; 3) increased permeability of the membrane/fluid system; and 4) the ability to effect difficult separations.

Removing the permeate from the backside of a membrane using a supercritical receiving fluid instead of a subcritical fluid offers a less energy-intensive method to recover the permeate from the receiving fluid. Conventionally, the permeate is recovered from the receiving fluid using distillation techniques which take advantage of the differences in vapor pressures between the two liquids. By using a supercritical receiving fluid, the permeate can be recovered by dropping the pressure of the mixture, thus causing a portion of the permeate to drop from solution. This technique takes advantage of the fact that the solubility of many permeates in supercritical fluids increases with increasing pressure. By dropping the pressure of the permeate/receiving solvent through an expansion valve, a portion of the permeate can be recovered. The amount of permeate recovered per cycle depends on the pressure drop through an expansion valve. When the solubility/pressure relationship for a specific system is inverse of that described, i.e., decreasing solubility with increasing pressure, the product can be recovered by reversing the expansion/compression operation.

The present technique offers the additional advantages of increased selectivity and increased permeability over conventional separation techniques because it takes advantage of the unique partitioning properties associated with supercritical receiving fluids. Exemplary supercritical receiving fluids include carbon dioxide, fluorocarbons, and low molecular weight alkanes such as ethane and propane. Other, more sophisticated supercritical fluids are available, but may be less preferred due to their toxicity, flammability or other undesirable properties. The receiving fluid preferably complements the membrane by having a partition coefficient favoring the permeate. This effect coincides with a lowering of the chemical potential on the back side of the membrane which increases the separation driving force across the membrane and increases the rate of permeate recovery.

The use of membrane and fluid characteristics facilitates and enhances mixture separation. The advantages of combining these parameters into a single process include reduced energy consumption, e.g., 85% energy savings over conventional distillation of ethanol/water mixtures to produce pure ethanol; the ability to complete product temperature sensitive separations at reduced temperatures; the ability to conduct in-situ separations in biologically-based processes to provide continuous extraction of product while improving reaction rates of the process by removing inhibiting products; and the ability to effect otherwise difficult separations.

As noted, the process of the instant invention features the use of a combination of membrane and fluid that are selected to pass certain feed component(s) through the membrane or reject other feed component(s) away from the membrane or both. In specific tests, supercritical carbon dioxide was selected as a solvent and three membranes (cellulose acetate, Teflon and TFC-185) were evaluated to separate a mixture of 86% water, 9% ethanol and 4.5% butanol. A cellulose acetate membrane showed no effect on the separation beyond what would have been expected from extraction with supercritical carbon dioxide alone. Teflon, a hydrophobic (water repelling) membrane, showed an enhancement in the alcohol content of the product stream. The TFC-185 hydrophilic (water seeking) membrane showed an increase in water in the product over that otherwise expected and an increase in alcohol content in the reject. In the production of pharmaceuticals and biological materials, separations are a critical factor in the cost of the product. In such applications, the process of this invention is used as a stand alone separation unit process or in-situ to the process producing these materials. Since biological products or by-products can poison or retard reaction rates in fermentors or reactors, the membrane separation technique of the present invention can be coupled with such reactors to remove product or by-products and enhance reaction rates. In addition, cleaned-up reject material from the feed side can be recycled to the process thereby saving chemical costs for a given process. Since the products in biological processes are often present in minute concentrations (one part in 100 or 1,000 or even 10,000) and are temperature sensitive, the present separation process offers the ability to complete these gross-cut separations (in a biological products sense) without thermally damaging the product thereby greatly reducing the cost of producing such products.

The foregoing and other features and advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

Figure 1:
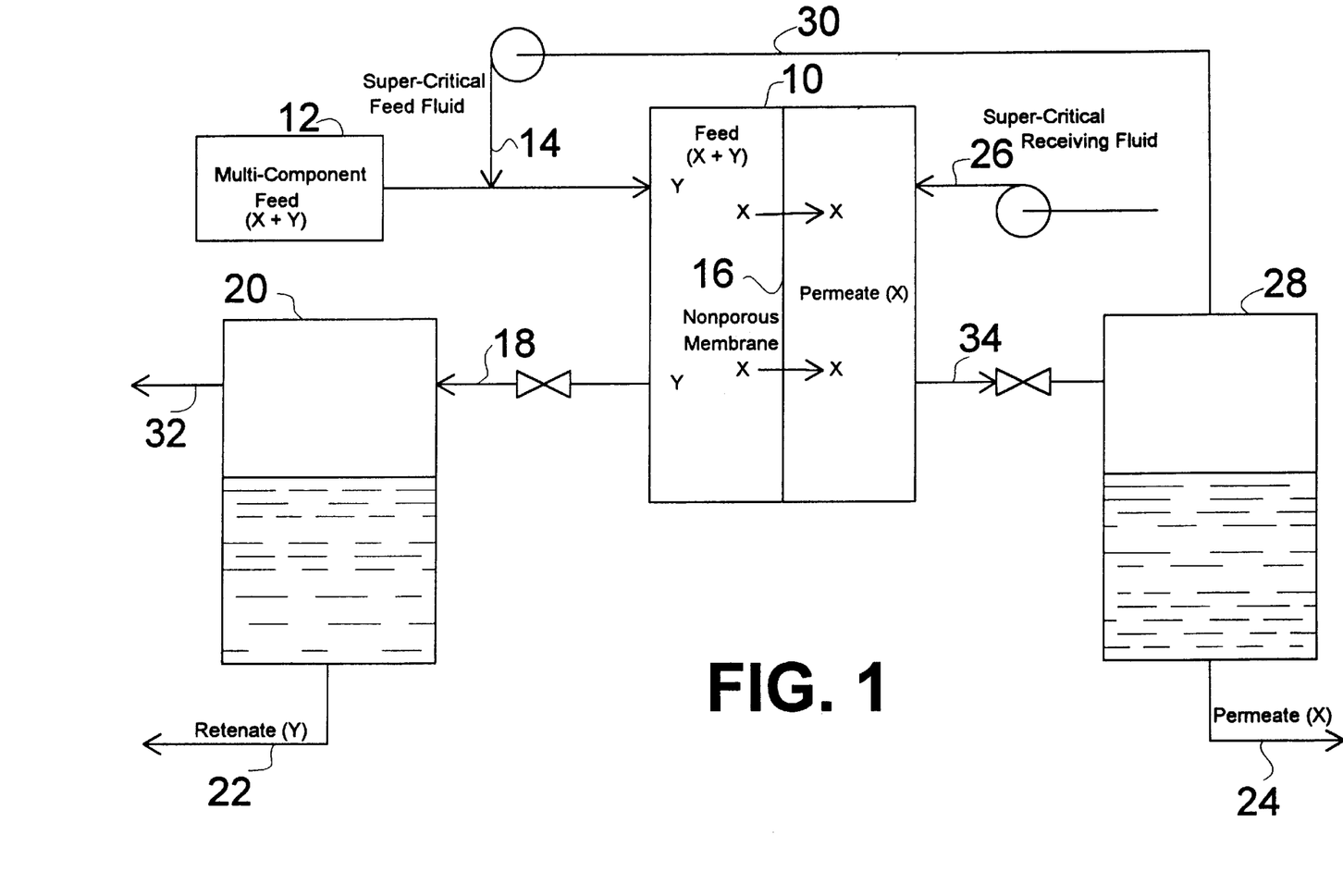
FIG. 1 is a schematic illustration that shows the use of a fresh (virgin) supercritical fluid applied to the permeate side of a nonporous membrane with subsequent separation of the permeate and fluid followed by recycle of the fluid to the feed side of the nonporous membrane.

In FIG. 1, a multi-component feed X+Y designated as 12 is mixed with a supercritical fluid from line 14 and is passed over a first side of nonporous membrane 16 in membrane container 10. One of the components X passes (permeates) through membrane 16 leaving behind component Y (retenate) which is retained in the feed fluid and along with the feed fluid is collected in container 20 after passing through line 18. The retenate Y is removed from container 20 through line 22. The feed fluid is removed through line 32 and is vented to the atmosphere in the case of a non-polluting fluid such as carbon dioxide, flamed in the case of many hydrocarbon fluids, or otherwise disposed of in conventional fashion known to those skilled in the art. The permeate X, upon passing through membrane 16, is removed from the second side of membrane 16 by passing a pure, freshly generated supercritical receiving fluid into the permeate side of container 10 through line 26 and over the second side of nonporous membrane 16. Permeate X and receiving fluid are passed from container 10 to container 28 through line 34. The permeate is separated from the receiving fluid and removed from tank 28 through line 24 while the receiving fluid is recycled to the feed side of membrane 16 through line 30 for use as the supercritical feed fluid. In such an arrangement, pure receiving fluid is fed through line 26 to membrane 16 to collects the permeate and then recycled to the feed side for use as the feed fluid in separations where the purity of the feed fluid may not be of importance to the process. Such processing is advantageous when the permeate tends to be unstable and/or contains unwanted volatiles and it is undesirable, inefficient, or process defeating to allow the buildup of unwanted by-products on the permeate side of the membrane but the recycle of the receiving fluid to the feed side of the membrane presents no processing difficulties. Because the feed fluid is disposed of after use on the feed side, the undesirable buildup of contaminating materials is also avoided on the feed side of the process. As a result, significant energy savings can be achieved as a result of pumping efficiencies using fresh fluids rather than recycled fluids. Equipment and membrane replacement cost savings are also achieved. For biological and pharmaceutical products, the buildup of by-products can lower the effectiveness of subsequent separation processes and destabilize the desired product. Although more solvent is consumed in using fresh fluids, for products with values of hundreds of dollars per pound, the cost of many solvents at a few pennies a pound is secondary to the quality and quantity of product delivered.

Figure 2:
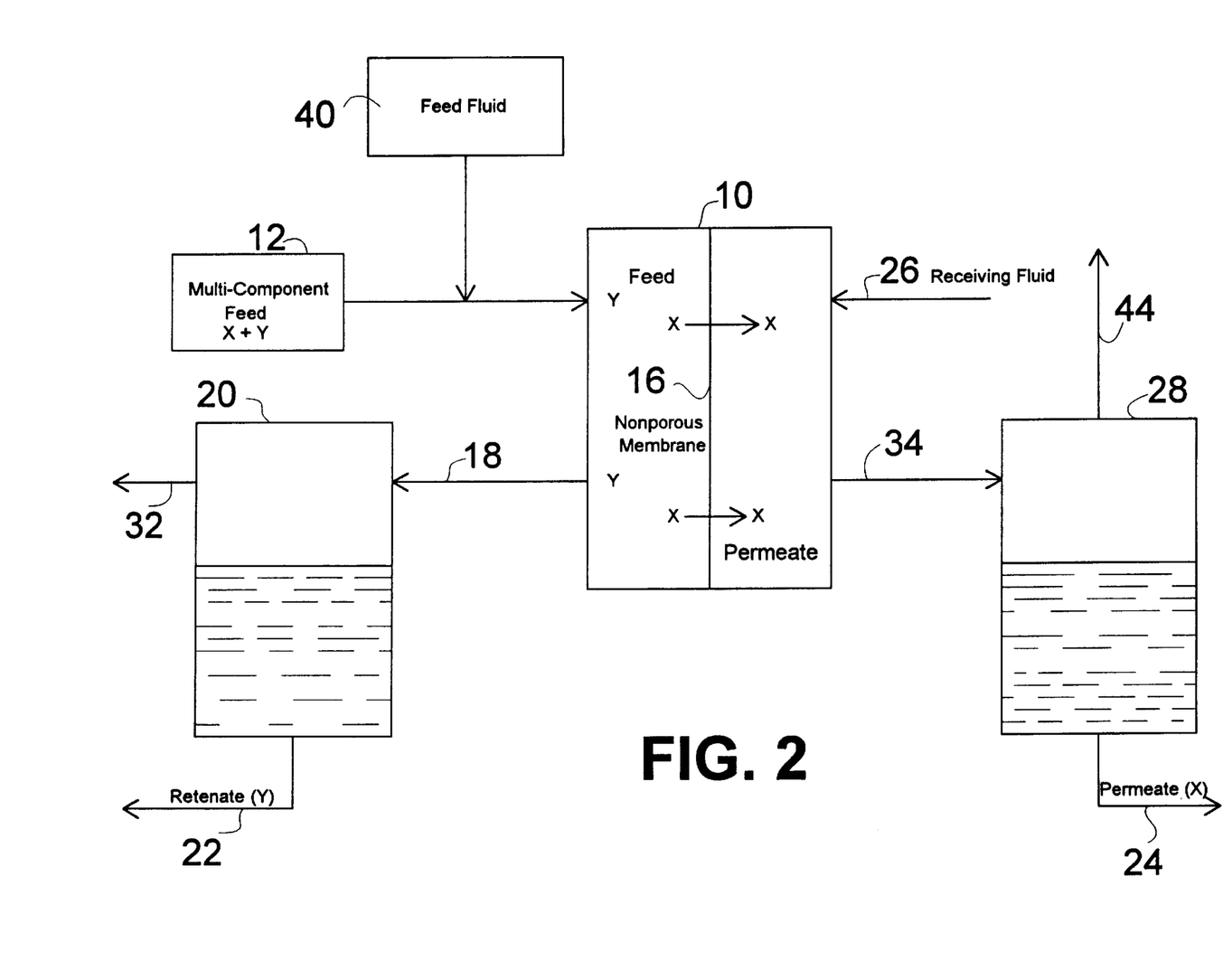
FIG. 2. Is a schematic illustration that illustrates the use of fresh fluids on both sides of the nonporous membrane.

FIG. 2. shows a more generalized form of the process. Here, a multi-component feed 12 consisting of at least two components X+Y and feed fluid 40 are passed over the first side of nonporous membrane 16 where component X passes through membrane 16 and the retenate and feed fluid are passed to container 20 where retenate Y and feed fluid are separated. Non-toxic fluids such as nitrogen and carbon dioxide may be vented to the atmosphere or otherwise disposed of, such as by flaming in the case of hydrocarbon fluids. A receiving fluid is passed over the second (permeate) side of membrane 16 through line 26 to remove permeate X. The receiving fluid and permeate are sent to container 28 through line 34 after which the permeate is removed through line 24 and the receiving fluid vented through line 44. In FIG. 2, only one side of the membrane need employ a supercritical fluid, typically the permeate side of the membrane. The feed fluid is not essential, and in some separations can be omitted altogether. As used here, a supercritical fluid is defined as a fluid above its critical temperature and critical pressure. Illustrative supercritical fluids include $CO_2$, ethylene, ethane, propane, sulfur hexafluoride, ammonia, nitrous oxide and chlorotrifluoromethane of which the critical temperatures and pressures are given in Table I. Such fluids can be used in either the supercritical or subcritical state.

As used here, a fluid that is "fresh to the process" is a fluid that has not been in contact with the same side of the nonporous membrane previously. That is, such a fluid is passed over one side of the nonporous membrane only once after which it may be recycled to the opposite side of the membrane or otherwise disposal of but never returned to the side of first use. Often the fluid is vented or flamed after its initial pass over a side of the membrane. Such a requirement is critical in maintaining process efficiency, reducing process energy requirements and equipment costs, affording stable product, and eliminating the buildup of undesirable and unwanted by-products. Typically a supercritical fluid is used fresh and passed only once over the second side of the membrane to remove permeate therefrom. However a fluid recycle to the opposite side of the membrane or a recycle mode of operation on the other side of the membrane is not precluded by this requirement. Nor is the recycle of retenate or permeate precluded over the same side of the membrane nor the use of the same fluid on the same side of different membranes in multistage separations, it being realized that multiple passes of feed or multiple membrane units (stages) are often necessary to achieve a satisfactory degree of separation from what is inherently a differential process, that is, the components rarely separate completely in a single pass. Rather, both components pass through the membrane but one in greater amounts than the other.

TABLE I

CRITICAL TEMPERATURES AND PRESSURES OF ILLUSTRATIVE SUPERCRITICAL FLUIDS

| Fluid | Temp ° C. | Pressure atm |
| --- | --- | --- |
| Carbon Dioxide | 31 | 73 |
| Ethylene | 10 | 50 |
| Ethane | 32 | 48 |
| Propylene | 92 | 46 |
| Propane | 97 | 42 |
| Sulfur Hexafluoride | 46 | 37 |
| Ammonia | 132 | 111 |
| Nitrous Oxide | 37 | 72 |
| Chlorotrifluoromethane | 29 | 39 |

Figure 3:
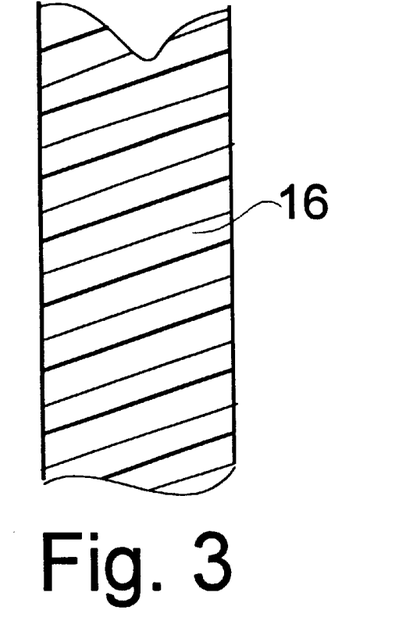
FIG. 3 is a partial cross-section of a nonporous (dense) membrane.
Figure 4:
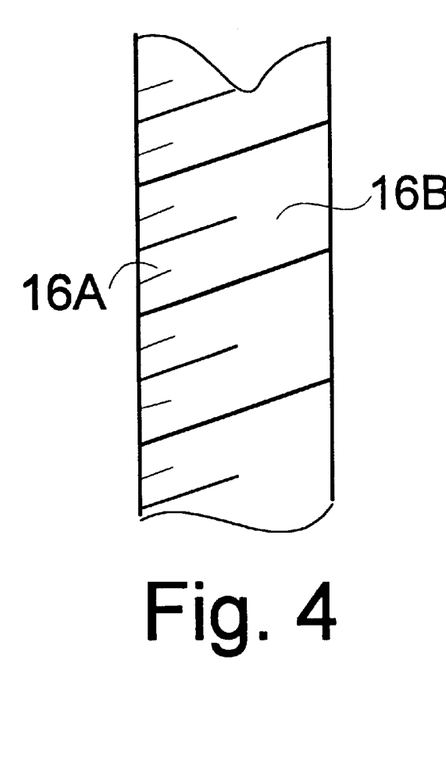
FIG. 4 is a partial cross-section of an asymmetrical membrane with a nonporous portion to the extreme left and becoming progressively more porous toward the right.
Figure 5:
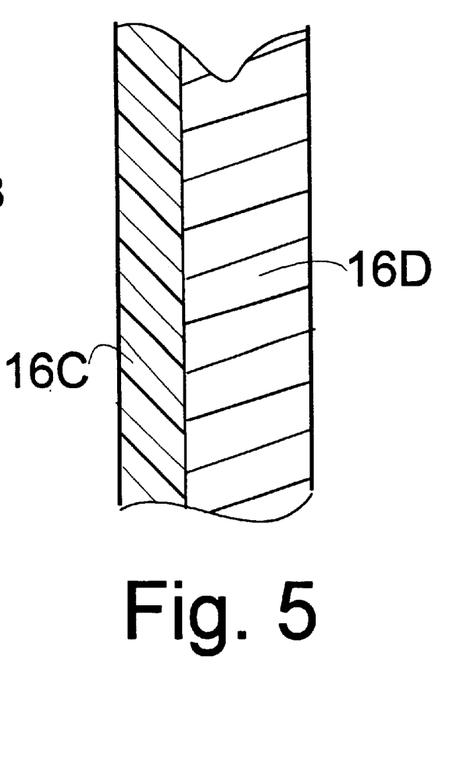
FIG. 5 is a partial cross-section of a composite membrane with a nonporous layer to the left and a porous layer to the right.

As shown in FIGS. 3–5, the instant invention contemplates the use of a wide variety of both "modified" or unmodified membranes. A "modified membrane" is a term used here to specify a membrane that is treated or changed to facilitate or retard passage of one or more components of the feed mixture. A combination of physical and chemical forces, i.e., the driving force, pushes the material(s) of interest through the membrane while the modifying constituents in a modified membrane or even an unmodified membrane repel the flow of one or more of the other feed components. To render a nonporous membrane more suitable for a particular separation, it can be modified to alter its separation characteristics. For example, a hydrophobic nonporous film of polyethylene, polypropylene, or polytetrafluoroethylene can be treated to render it less hydrophobic or even hydrophilic. Such treatments include exposure to an agents such as chromic acid, concentrated sulfuric acid or a powerful oxidizing agent. Alternatively, the film can be exposed to a corona discharge or other ion or free radical discharge.

To effect a multi-component separation, a nonporous membrane is provided to facilitate the passage of a particular component, or reject a particular component, or both. Thus a hydrophobic nonporous membrane such as a polyfluorocarbon membrane is used to repel water and water-like components and afford a water-free permeate. A hydrophilic membrane is used to attract and provide a water permeate while leaving a water-free retenate. As a consequence, it is possible to remove a valuable hydrophilic material from a predominately aqueous feed stock as the permeate or to remove contaminate water as the permeate from a valuable hydrophobic material using a hydrophilic membrane such as TFC-185 to leave a water-free retenate. Thus it is to be realized that the product of interest may be found as either the permeate or retenate.

Fundamental to the invention is the use of a nonporous (dense) membrane. FIG. 3 illustrates a basic nonporous membrane 16 that is uniform and dense throughout. As used here the term nonporous refers to a membrane in which separation takes place as a result of differences in solubility of the separating molecules of the multi-component feed mixture in the membrane or differences in diffusivity of the separating molecules or both. Nonporous membranes are characterized by the fact that essentially all of the unoccupied volume of the membrane is essentially the space between the atomic and molecular constituents of the membrane, e.g., the space between the polymeric chains of the membrane, rather than pores of microscopic dimensions. Although ceramics, metals, carbon, inorganic glasses, and other materials may be formed and used as nonporous membranes, typically the membrane material of choice is an organic polymer. Both natural materials such as cellulose and synthetic materials such polymers that range from simple hydrocarbons like polyethylene and polypropylene to more complex structures such as polar polyamides or even ionic structures in which cations and anions are attached to the polymeric backbone are contemplated by this invention.

Separation is achieved in a dense membrane as a result of physiochemical interations between the permeating species with the membrane material including ionic interactions, dipole interactions and van der Waal forces. Because transport through nonporous membranes is dependent on the polymer structure and molecular motion of the polymer segments, temperature often plays a role in the separation process.

Dense (nonporous) membranes can be formed by a variety of techniques including solution techniques, melt processing, and direct polymerization. Solution methods generally involve casting a film and them completely evaporating the solvent. Melt-extrusion techniques follow the same strategy as in convention plastics processing. If the membrane must be cross-linked, it is formed directly by polymerization with a cross-linking agent. In some cases, the membrane can be made by melt or solution methods followed by cross-linking as a secondary reaction.

Figure 6:
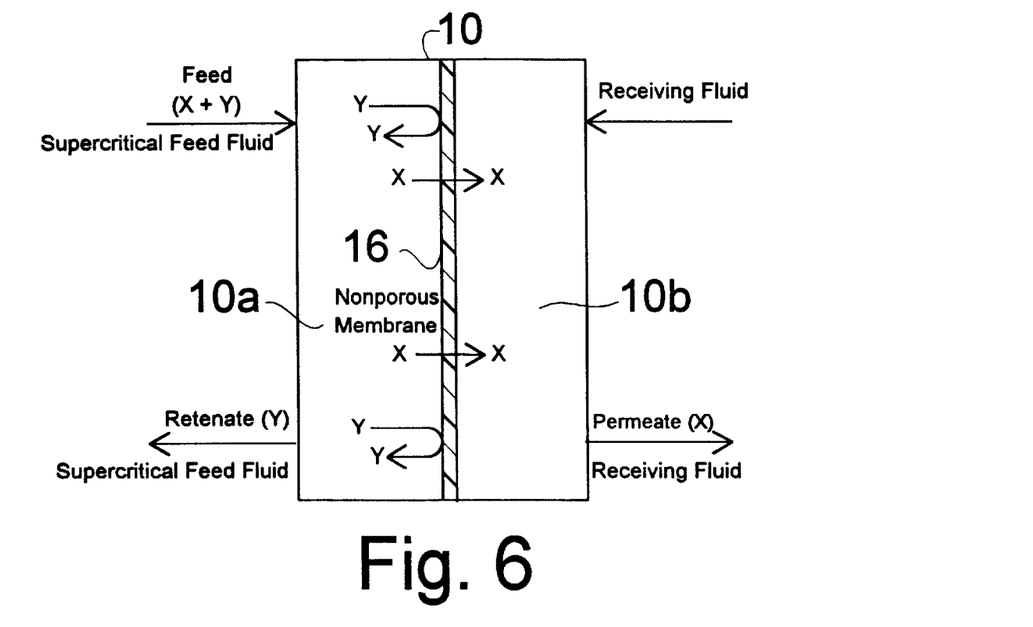
FIG. 6 is a schematic representation of the use of a nonporous membrane that promotes passage of component of the feed through the membrane using a supercritical solvent on the feed side of the membrane.

This invention also contemplates the use of asymmetric membranes such as shown in FIG. 4 and composite membranes shown in FIG. 5. The asymmetric membrane of FIG. 4 is characterized in having a dense (nonporous) region 16A and a porous region. 16B. The porous region is used for support or to enhance separation by allowing the receiving fluid to contact the nonporous region to facilitate or retard the passage of various components of the feed mixture or both. Asymmetric membranes combine the high selectivity of a dense membrane with the high permeation rate of a very thin membrane. The composite membrane of FIG. 6 is formed from a thin nonporous layer 16C and a porous support layer 16D. Such membranes can be prepared by dip-coating, interfacial polymerization, in-situ polymerization, and plasma polymerization. For many applications, a composite membrane can be formed by placing a film of a nonporous material and a film of a porous material next to each other and clamping or otherwise mechanically urging the two films together. For support purposes, the porous membrane is often a microporous metal, glass, or porcelain material.

FIGS. 6–9 illustrate some of the various nonporous membrane and feed and receiving fluid combinations that are contemplated by the present invention. In FIG. 6, the feed X+Y has been solubilized in a supercritical feed fluid and enters the first (retenate) side 10$a$ of container 10 where it passes over the first side of membrane 16. The permeate component X passes through nonporous hydrophobic membrane 16, e.g., a Teflon membrane, to the opposite (second) side 10$b$ of container 10, i.e., to the permeate side of membrane 16. The hydrophobic membrane 16 repels component Y, e.g, water, and allows for the collection of an essentially water-free permeate X on the opposite side 10$b$ of membrane 16 using either a supercritical or subcritical receiving fluid.

To illustrate further, a specific application involves separation of an ethanol-water solution using a supercritical carbon dioxide ($CO_2$) feed fluid and a hydrophobic membrane. Alcohol dissolves in the supercritical $CO_2$ feed fluid and preferentially passes through the membrane. When water begins to pass through the membrane, it is repelled by the hydrophobic membrane structure. The permeate is collected in a stream of supercritical or subcritical carbon dioxide, the pressure is then reduced evolving gaseous $CO_2$ and leaving liquid ethanol.

Figure 7:
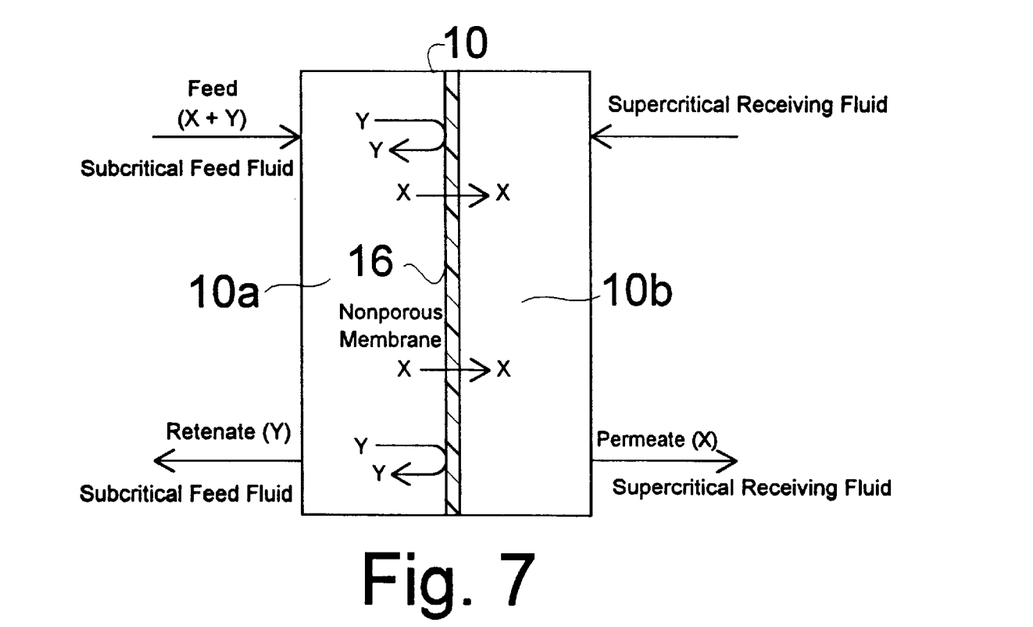
FIG. 7 is a schematic representation of the use of a nonporous membrane that promotes passage of component of the feed through the membrane using a subcritical fluid on the feed side of the membrane.

Alternatively, the use of a hydrophilic membrane such as a thin film TFC-185 membrane can be used to preferentially promote passage of contaminate water through membrane 16 as the permeate while retarding the passage of non-aqueous components thereby concentrating the non-aqueous component(s) in the reject (retenate) and, in effect, leaving the retenate water free. FIG. 7 illustrates a similar process, except that a subcritical feed fluid is used to solubilize the feed and a supercritical receiving fluid is used to remove the permeate X. Nonporous membrane 16 is selected or modified to promote the passage of component X through membrane 16 as the permeate while retarding (rejecting) passage of component Y through the membrane, that is, leaving component Y as the retenate.

Figure 8:
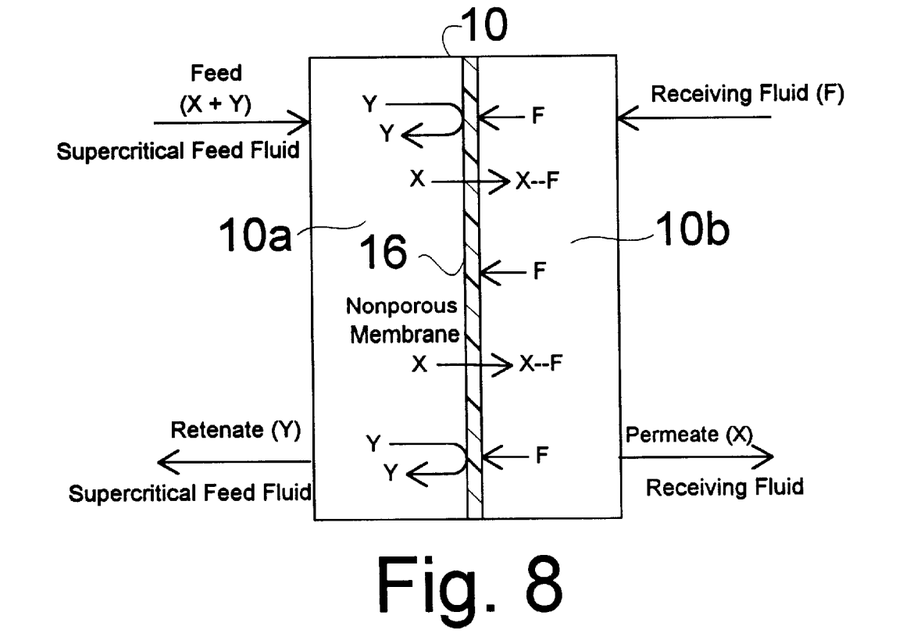
FIG. 8 is a schematic representation of the use of a subcritical or supercritical fluid on the permeate side of the membrane to retard passage of a feed component through the membrane.

In FIG. 8, a multi-component feed X+Y is solubilized in a supercritical feed fluid and is passed by an unmodified nonporous membrane 16 on the first side 10$a$ of container 10. By using a hydrophobic receiving fluid (either supercritical or subcritical) F on the permeate (second) side 10$b$ of membrane 16, water or water-like component Y is deterred (retarded) from passing through membrane 16 by the repulsion of the receiving fluid F. Likewise the receiving fluid F may attract the X component as indicated by X—F and "pull" X through the membrane. In situations where it is desirable to pass the water through the membrane, a hydrophilic receiving fluid is used in either the subcritical or supercritical state on the permeate side of the membrane. In such a case, the receiving fluid on the permeate (second) side of the membrane pulls or promotes the passage of the water component through the membrane.

Figure 9:
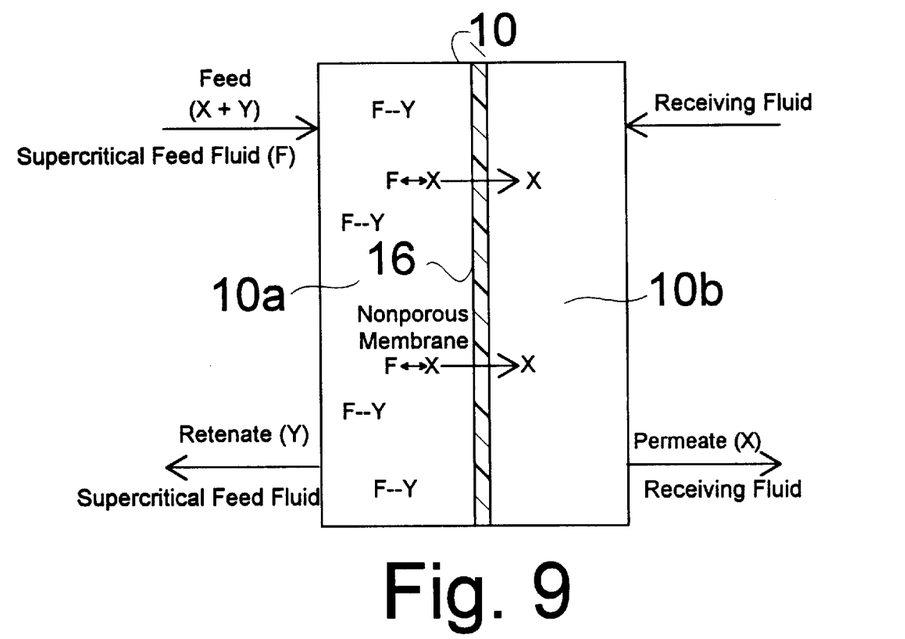
FIG. 9 is a schematic representation of the use of a supercritical fluid on the feed side of the membrane to retard passage of a feed component through the membrane and promote passage of another feed component through the membrane.

As shown in FIG. 9, a feed fluid is provided on the feed (first) side 10$a$ of nonporous membrane 16 that holds or retards passage of a particular component Y through the nonporous membrane as designated by the F—Y attraction. The same fluid may also repel or push another component X through the membrane as designated by the X<—>F repulsion. A hydrophilic subcritical or supercritical feed fluid on the feed side 10$a$ tends to hold a hydrophilic feed component Y and retard its ability to pass through nonporous membrane 16 while tending to push or promote the passage of a hydrophobic component through membrane 16.

As has been illustrated in FIGS. 6–9, one of the key features of this invention is to provide various combinations of first side feed fluids, second side receiving fluids, and a nonporous membrane that promote the passage of certain components in a feed and retards passage of other components through the membrane. Such separations are carried out under the constraint that at least one of the fluids on either the permeate or retenate side of the membrane must be fresh to the process, that is, the fluid cannot be recycled to the same side of the process and that one of the fluids on either side of the membrane must be in a supercritical state, the use of a supercritical fluid being an, essential feature of the invention.

This invention is especially useful in the chemical, pharmaceutical, and biotechnology industries. This invention can be used in the chemical industries to break azeotropic compositions using less energy than is used in extractive and azeotropic distillation techniques. For example, certain olefins (straight chained hydrocarbons) and aromatic compounds (ringed hydrocarbons) are difficult to separate due to similar boiling points. By using an olefinic membrane and extracting (receiving) fluid, the olefin passes through the membrane into the receiving fluid with the aromatic remaining in the feed solution as reject (retenate)., Such separations are very difficult to complete, both technically and economically, using conventional techniques. Pharmaceutical applications include the cleanup of medicines and extraction of fragrances. Biotechnology related applications center on the cleanup of protein solutions. Other applications include the separation of salt-oil-water solutions (removal of oil from desalination plant feed-water), waste water cleanup (removal of organics), and decaffeination.

For binary separations, particularly those which have similar boiling points, the energy requirements to effect the separation are very large. Illustrative of such high energy separations are cyclohexane/benzene, cyclohexene/cyclohexane, methanol/hexane, styrene/ethyl benzene, ethanol/water, and the separation of biologically sensitive materials. As shown in Table II, the purification energy requirements to obtain one gallon of anhydrous ethanol from a 6% water/ethanol mixture is about 54,000 BTU/gallon. The present fluid-membrane separation technique requires much less energy (about 6,500 BTU/gallon) than conventional extractive and azeotropic distillation techniques. It also solves many of the problems associated with conventional separation technology including the high energy consumption noted with azeotropic distillation, solvent recovery problems associated with solvent extraction, capacity problems with dehydration techniques, capacity and regeneration problems with adsorption/absorption processes, and flux and selectivity problems associated with membrane processes.

TABLE II

ENERGY REQUIREMENT FOR ETHANOL (EtOH)/WATER SEPARATION

| Change in EtOH Concn. | Conventional Distillation | Membrane Separation |
| --- | --- | --- |
| 6% to 95% | 39,000 BTU/gallon | |
| 95% to 100 % | 14,200 BTU/gallon | |
| TOTAL | 53,800 BTU/Gallon | 6,500 BTU/gallon* |

*Assuming 10% recovery of product per pass of receiving fluid across membrane and 10 passes.

This fluid-membrane separation technique is highly advantageous in enhancing the selectivity and rate of transport of a desired species across a semi-permeable nonporous membrane. Although it follows from the concepts of pervaporization and perstraction using subcritical fluids, it reduces or eliminates many of the problems associated with them. For example, pervaporization requires a mechanism to supply energy to the permeate fluid being evaporated and the low vapor pressures on the permeate side of the membrane require high fluid fluxes to make the process economical. The present invention solves both of these problems by the use of an appropriately selected membrane to improve permeate flux and the use of a flow of receiving fluid on the permeate side to eliminate the phase change energy requirements of the pervaporization technique. The present invention can save up to 85% of the energy required to purify binary mixtures with similar boiling points (i.e., azeotropic mixtures) using conventional distillation techniques and it provides for separations not easily completed using existing technologies such as oil/salt water and ethanol/water.

To demonstrate the supercritical fluid-membrane separation process, a semi-static system was used. That is, flow was created by bleeding feed and receiving fluid from pressurized reservoirs (autoclaves) across either side of a nonporous membrane. The feed system (the first or retenate side of the membrane) was driven by a regulated bottle of compressed nitrogen and the receiving fluid system (the second or permeate side of the membrane) by heated, compressed carbon dioxide. Hydrophobic, hydrophilic and neutral membranes were uses. Supercritical carbon dioxide was used as a receiving fluid.

Figure 10:
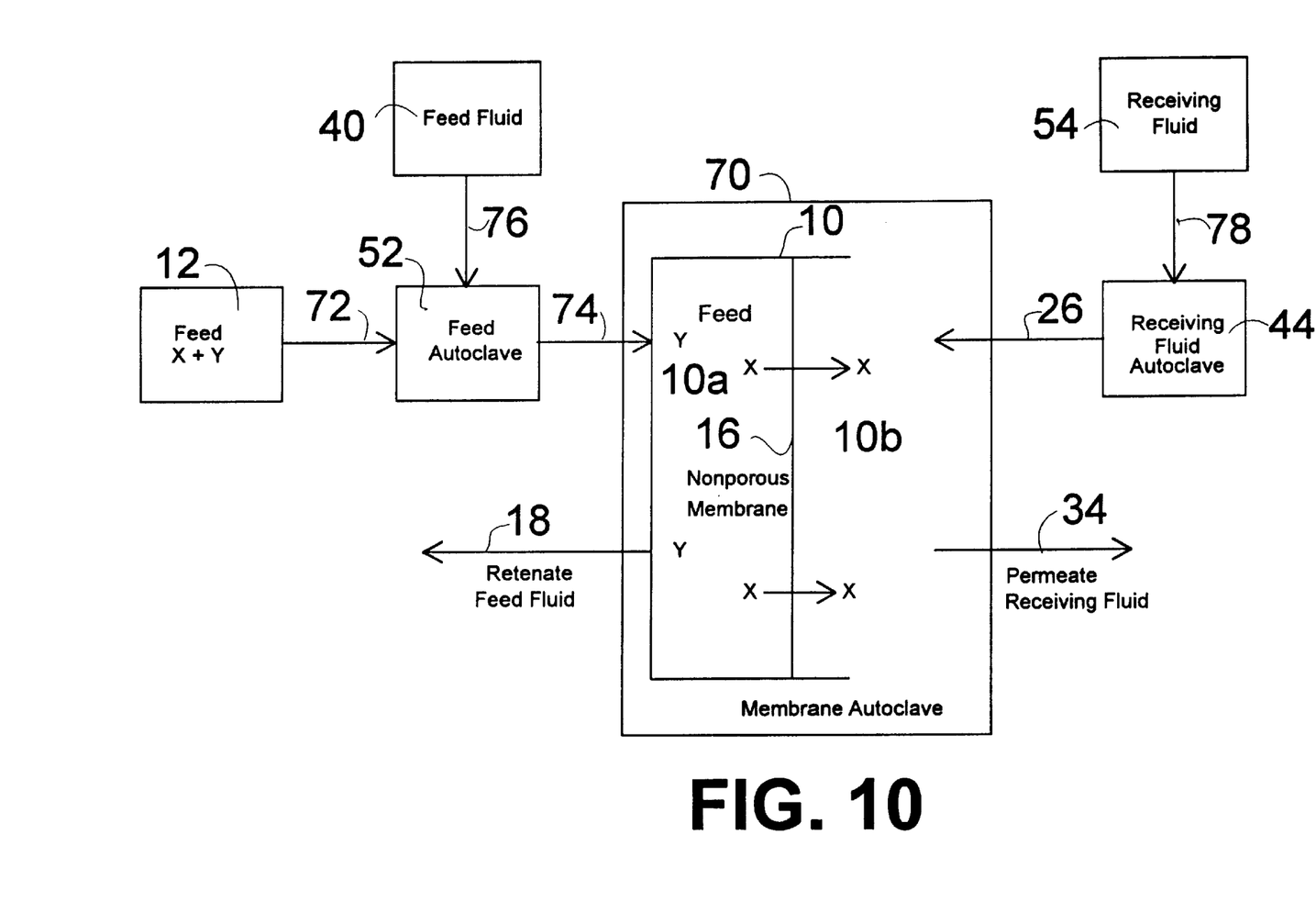
FIG. 10 is a schematic view of an experimental set-up for carrying out the invention.

The "flow cell" shown schematically in FIG. 10 was used. The cell was designed to pump fluids across both sides of the membrane, hence the term "flow cell". The feed is pumped up to an operating pressure slightly to moderately higher than the receiving fluid and continuously pumped from a feed reservoir autoclave 52 across the front side 10a of membrane 16. On the back side 10b of membrane 16, the receiving fluid initially is pumped to, or slightly above, its critical state and then continuously circulated across the back side 10b of the membrane 16 to remove permeate. The permeate is removed from the receiving fluid by passing the mixture through an expansion valve, dropping out the permeate. Not all of the permeate is necessarily removed from the receiving fluid. The amount removed depends on the pressure drop across the expansion valve since the solubility of the permeate in the receiving fluid generally decreases with decreasing pressure. The membrane cell 10 itself was as split case design wherein the membrane was sealed in place by a set of O-rings (¾" nitrile (Buna-N) rubber). Flow across membrane 16 was through grooves machined into both halves of the case. The set-up used two booster pumps to get the system to its operating pressures and two circulating pumps to circulate the feed and receiving fluids once they reached operating pressures.

The system shown in FIG. 10 consisted of a feed autoclave 52, a membrane autoclave 70, a receiving fluid autoclave 44, a membrane cell 10 and necessary control and monitoring equipment. Feed solution 12 was supplied from the 300 mL feed autoclave 52 to the membrane cell 10 suspended in the membrane autoclave 70 and circulated across the membrane 16 by bleeding feed from the membrane cell 10 through line 18. Nitrogen feed fluid from a nitrogen cylinder was used to maintain the required pressure in the feed autoclave 52. Liquid receiving fluid in gas cylinder 54 was supplied to a 4 liter autoclave 44 through line 78 and then heated until it reached the supercritical conditions desired. Once these conditions were reached, a portion of the receiving fluid was transferred to the 2 liter membrane autoclave 70, where it surrounded the membrane cell 10. Temperatures in all three autoclaves, 52, 70 and 44, were maintained using heating tapes (i.e., resistance heating)

and were monitored using chromel-alumel thermocouples. The temperature of the autoclaves was held constant using feedback controllers tied to the power supply of the heating tapes and the signals from the thermocouples.

The membrane cell 10, suspended from the top of the membrane autoclave 70, was made from a circular piece of stainless steel tube and isolated the feed solution from the receiving fluid. The membrane cell 10 had feed inlet and outlet tubes 74 and 18, respectively, passing through autoclave 70. The membrane-holding cell 10 was machined in such a manner that an O-ring and a porous stainless steel disc could be placed into each half of the cell. The O-rings sealed the membrane between the two halves of the cell. The porous discs physically supported the membrane while allowing the feed and receiving fluids to have intimate contact with the membrane.

Forty milliliter sample bottles were used to collect samples during the experiments. The sample bottles were attached to the membrane reservoir 70 using stainless steel tubing and fittings 34. Flow to the bottles was controlled using needle valves, which were heat-traced to prevent icing.

Most of the equipment used in the experiments was manufactured by Autoclave Engineers, Matheson, or Whitey. The autoclaves and many of the valves and fittings used in the membrane system were purchased from Autoclave Engineers. Matheson provided compressed gases, regulators, cylinder scale, and flexible tubing for the system. Whitey provided the sample bottles and some of the valves needed in the experimental system. Heating tapes were obtained from VWR. The porous stainless steel discs were machined from 1/16-inch thick sheet of the material which was purchased from Pall Process Filtration Corporation.

Three membranes were used. These included Gore-Tex® (Teflon), dialysis-grade cellophane, and Universal Oil Products (UOP) TFC-185 membranes. Both the Gore-Tex® (Teflon) and cellophane were symmetric in nature, whereas the TFC-185 was an asymmetric membrane, that is, its structure changed from the front to the back side of the membrane. As noted previously, asymmetric membranes are characterized by a thin, compact active surface supported by a porous structure of similar material. Typically, the surface thickness of the compact portion of the membrane is 1/100 to 1/1000 of the thickness of the support structure.

Gore-Tex® membranes are constructed of fluorocarbons which are inherently hydrophobic. The Gore-Tex membrane selected (0.2 $\mu$m pore size) was designed to prevent water from passing through it as long as the pressure across the membrane did not exceed 40 pounds. A 0.02 $\mu$m Gore-Tex membrane with a water entry pressure of 250 pounds was available, but the more porous membrane was selected to maximize permeate flux. Dialysis-grade cellophane was used. UOP's TFC-185 membrane, which is very similar to the NS-100, was used because of its know separation characteristics.

Membrane 16 was cut from a flat sheet of membrane material, washed, and inspected for flaws. If no flaws in the cut-out piece of membrane were observed, the membrane was placed between the membrane cell flanges, with its active side toward the feed side of the cell, and secured into place by tightening four recessed screws. The loaded membrane cell 10 was attached to the head of the membrane autoclave 70. The feed solution was placed into the feed inlet line 74 filling the membrane cell. The valve on the exit line 18 from the membrane cell 10 was open and when feed solution was observed dripping from the line 18, the membrane cell 10 was considered to be full. The feed line 74 was reattached to the feed reservoir (autoclave) 52, which was then filled with feed 12. Once the feed reservoir 52 was filled with feed, it was sealed and readied for a process run. The gas cylinder 54 containing carbon dioxide receiving fluid was heated to approximately 35° C. and then allowed to discharge into the isolated receiving fluid autoclave 44 through line 78. After the pressures in the receiving fluid autoclave 44 and the gas cylinder 54 were equalized, the receiving fluid autoclave 44 was heated until the critical conditions desired were reached. The membrane-autoclave 70 and feed autoclave 70 were preheated to 35° C. During the initial run, the system was brought to operating pressure by simultaneously increasing the nitrogen pressure on the feed and opening the valve between the membrane autoclave 70 and receiving fluid autoclave 44 to allow supercritical $CO_2$ into the membrane autoclave 70. A slight positive pressure is maintained on the feed side of the membrane to ensure that no reverse permeate flow occurs. A magnetically driven stirrer in the membrane autoclave 70 was then started to ensure mixing of the receiving fluid 54 with the permeate. The nitrogen feed side regulator was then set to a pressure approximately 20 psi higher than that of the receiving fluid reservoir 44 and the feed valve opened to begin the run. In addition, a needle valve on the feed exhaust line 18 was opened to the atmosphere which ensured flow across the feed side 10a of the membrane 16. The discharge was kept small enough to ensure that the feed reservoir 52 was not depleted during the run. Once operating, the membrane system was maintained at 35 to 37° C. and approximately 2000 psi. The pressure was maintained by controlling the temperature of, the feed autoclave 52.

Two or three samples of the receiving fluid were taken during a typical four hour process cycle. The sample bulbs were evacuated and weighed before being attached to the membrane autoclave feed line 34. The bulb was placed in a dewer containing dry ice and acetone. At a designated time, the sample line valve was opened and the sampled allowed to flow into the sample bulb until it reached a pressure of approximately 1400 psi. Heating tape was placed around the sample line valve to prevent icing around the valve. The dry ice-acetone was used to cool the sample collected. Once collected, the sample was detached from the sample line and weighed. After weighing, the sample bottle was weighed to determine the amount of alcohol solution contained in the sample. The alcohol solution was recovered from the sample bottle by heating the bottle and collecting the evaporated sample in a glass cold trap.

The cold trap collected sample was analyzed for water, ethanol, and butanol using Varian 3700 gas chromatograph containing Tenax-packed columns. Tenax-packed columns were selected because of their ability to identify the amount of water contained in a sample. The GC was standardized using distilled water and reagent-grade samples of ethanol and butanol.

Shutdown of the experimental system was affected by: 1) isolating the feed autoclave 52 and receiving fluid autoclave 44 from the membrane autoclave 70, 2) shutting off the power supply to the heating tapes, 3) opening a bypass valve between the two sides 10a and 10b of the membrane 16, and 4) shutting off the power supply to the magnetically coupled autoclave stirrers. Isolation of the feed and receiving fluid autoclaves was accomplished by closing two valves in lines 26 and 74. The $CO_2$ contained in the receiving fluid autoclave 44 was saved for the next run while the nitrogen cap on the feed autoclave 52 was relieved to determine the amount of feed 12 remaining in the autoclave 52. The temperature of the autoclaves was dropped to 21° C. by removing the power supply to the heating tapes, while the membrane system pressure was allowed to come to equilibrium (by opening the bypass valve) to prevent damage to the membrane. Comparative results for extraction alone, the membrane alone, and solvent-membrane combination of the present invention are summarized in Table III.

It is possible that changes in configurations to other than those shown could be used but hat which is shown if preferred and typical. The present invention may suitably comprise, consist of, or consist essentially a supercritical fluid on one side of the membrane or the use of fresh (virgin) fluid on one side of the membrane or both. The invention illustratively disclosed herein suitably may be practiced in the absence of any element which is not specifically disclosed herein.

TABLE III

COMPARATIVE DATA
MEMBRANE-SOLVENT SEPARATION USING
SUPERCRITICAL CARBON DIOXIDE RECEIVING FLUID

| Feed Mixture Component | Component Weight % | Extraction Alone | Membrane Alone | Teflon Membrane (passes alcohol) | TFC-185 Membrane (passes water) | Cellulose Acetate Membrane (Neutral effect) |
|---|---|---|---|---|---|---|
| Water | 86% | 20% | 60–80% | 10% | 94% | 28% |
| Ethanol | 9% | 30% | 10–30% | 40% | 3% | 28% |
| Butanol | 4.5% | 50% | <10% | 49% | 3% | 44% |

It is therefore understood that although the present invention has been specifically disclosed with the preferred embodiment and examples, modifications to the processing steps will be apparent to those skilled in the art and such modifications and variations are considered to be equivalent to and within the scope of the disclosed invention and the appended claims.

I claim:
1. A fluid-membrane separation process comprising
   a. providing a nonporous membrane with a first side and a second side;
   b. providing a mixture having at least a first component and a second component;
   c. providing a first fluid and a second fluid to said process wherein at least one of said first fluid and said second fluid is fresh to and cannot be recycled to the same side of said process and at least one of said first fluid and said second fluid is in a supercritical state;
   d. mixing said mixture having said first component and said second component with said first fluid to form a fluid mixture of said first fluid and said mixture;
   e. passing said fluid mixture of said first fluid and said mixture of said first component and said second component over said first side of said membrane to obtain a mixture of a retenate of said second component and said first fluid; and
   f. removing said first component of said mixture from said second side of said membrane by passing said second fluid over said second side of said nonporous membrane to obtain a mixture of a permeate of said first component and said second fluid.

2. The process according to claim 1 further comprising the step of selecting said nonporous membrane to promote passage of said first component of said mixture through said membrane.

3. The process according to claim 1 further comprising the step of treating said nonporous membrane to form a modified membrane that promotes passage of said first component of said mixture through said membrane.

4. The process according to claim 1 further comprising the step of selecting said first fluid to promote passage of said first component of said mixture through said membrane.

5. The process according to claim 1 further comprising the step of selecting said second fluid to promote passage of said first component of said mixture through said nonporous membrane.

6. The process according to claim 1 further comprising the step of selecting said first fluid and said membrane to promote passage of said first component through said nonporous membrane.

7. The process according to claim 1 further comprising the step of selecting said second fluid and said membrane to promote passage of said first component through said nonporous membrane.

8. The process according to claim 1 further comprising the step of selecting said first fluid and said second fluid to promote passage of said first component through said nonporous membrane.

9. The process according to claim 1 further comprising the step of selecting said first fluid, said second fluid, and said membrane to promote passage of said first component through said nonporous membrane.

10. The process according to claim 1 further comprising the step of selecting said nonporous membrane to retard passage of said second component of said mixture through said membrane.

11. The process according to claim 1 further comprising the step of treating said nonporous membrane to form a modified membrane that retards passage of said second component of said mixture through said membrane.

12. The process according to claim 1 further comprising the step of selecting said second fluid to retard passage of said second component of said mixture through said membrane.

13. The process according to claim 1 further comprising the step of selecting said first fluid to retard passage of said second component of said mixture through said nonporous membrane.

14. The process according to claim 1 further comprising the step of selecting said second fluid and said membrane to retard passage of said second component through said nonporous membrane.

15. The process according to claim 1 further comprising the step of selecting said first fluid and said membrane to retard passage of said second component through said nonporous membrane.

16. The process according to claim 1 further comprising the step of selecting said first fluid and said second fluid to retard passage of said second component through said nonporous membrane.

17. The process according to claim 1 further comprising the step of selecting said first fluid, said second fluid, and said membrane to retard passage of said second component through said nonporous membrane.

18. The process according to claim 1 further comprising the step of recovering at least one of said permeate of said first component and said retenate of said second component.

19. The process according to claim 1 further comprising recovering said second fluid as a recovered second fluid from said mixture of said permeate and said second fluid.

20. The process according to claim 19 further comprising the step of using said recovered second fluid as said first fluid.

21. The process according to claim 20 wherein said second fluid is in said supercritical state.

22. The process according to claim 20 wherein said first fluid recovered from said second fluid is in said supercritical state.

23. A fluid-membrane separation process comprising
   a. providing a nonporous membrane with a first side and a second side;
   b. providing a mixture having at least a first component and a second component;
   c. passing said mixture of said first component and said second component over said first side of said membrane to obtain a retenate of said second component on said first side of said membrane and a permeate of said first component on said second side of said membrane;
   d. passing a fresh fluid in a supercritical state over at least one of said first side and said second side of said nonporous membrane wherein said fresh fluid cannot be recycled to the same side of said nonporous membrane; and
   e. removing said fresh fluid from said first side or said second side of said nonporous membrane after a single pass over said first side or said second side of said membrane.

24. The process according to claim 23 wherein said fluid is passed over said second side of said nonporous membrane.

25. The process according to claim 24 further comprising the step of passing said fluid to said first side of said nonporous membrane.

26. The process according to claim 25 wherein said fluid is passed to said first side of said nonporous membrane in said supercritical state.

27. The process according to claim 23 further comprising the step of selecting at least one of said fluid and said nonporous membrane to promote passage of said first component through said membrane.

28. The process according to claim 23 further comprising the step of selecting at least one of said fluid and said nonporous membrane to retard passage of said second component through said membrane.

29. The process according to claim 23 further comprising the step of recycling at least partially said retenate to said first side of said membrane.

30. The process according to claim 23 further comprising the step of passing one of said retenate and said permeate to a second membrane for additional separation.

* * * * *

UNITED STATES PATENT AND TRADEMARK OFFICE
CERTIFICATE OF CORRECTION

PATENT NO. : 6,649,062 B1 Page 1 of 1
DATED : November 18, 2003
INVENTOR(S) : Stephen E. Petty It is certified that error appears in the above-identified patent and that said Letters Patent is hereby corrected as shown below:

Column 4,
Line 3, "retenate). new A driving force" should be
-- retenate.
　　　A driving force --

Column 7,
Line 44, "the retentate" should be -- the retenate Y --.

Column 12,
Line 25, "uses." should be -- used. --

Column 14,
Line 12, "feed autoclave 70" should be -- feed autoclave 52 --

Column 15,
Line 9, "hat" should be -- that --.
Line 9, "if" should be -- is --.

Signed and Sealed this

Tenth Day of February, 2004

JON W. DUDAS
*Acting Director of the United States Patent and Trademark Office*